United States Patent [19]
Graff et al.

[11] Patent Number: 5,433,274
[45] Date of Patent: Jul. 18, 1995

[54] HYDRAULIC CONNECTOR

[75] Inventors: Jerry C. Graff, Houston; William C. Parks, Katy, both of Tex.

[73] Assignee: Sonsub, Inc., Houston, Tex.

[21] Appl. No.: 100,478

[22] Filed: Jul. 30, 1993

[51] Int. Cl.$^6$ ............................................. E21B 33/00
[52] U.S. Cl. ........................................ 166/368; 285/18
[58] Field of Search ............................. 166/368, 84–89; 285/18, 24, 140–144, 137.2

[56] References Cited

U.S. PATENT DOCUMENTS

| | | | |
|---|---|---|---|
| 2,962,096 | 11/1960 | Knox | 166/75 |
| 3,099,317 | 7/1963 | Todd | 166/66.5 |
| 3,222,088 | 12/1965 | Haeber | 285/18 |
| 3,334,923 | 8/1967 | Putch | 285/18 |
| 3,338,596 | 8/1967 | Knox | 285/18 |
| 3,414,056 | 12/1968 | Brown et al. | 166/89 |
| 3,477,744 | 11/1969 | Brown | 285/18 |
| 3,492,027 | 1/1970 | Herring | 285/18 |
| 3,695,633 | 10/1972 | Hanes | 285/18 |
| 3,741,296 | 6/1973 | Murman et al. | 166/0.6 |
| 4,433,859 | 2/1984 | Driver et al. | 285/34 |
| 4,451,056 | 5/1984 | Galle, Jr. | 285/3 |
| 4,496,172 | 1/1985 | Walker | 285/18 |
| 4,516,795 | 5/1985 | Baugh | 285/315 |
| 4,526,406 | 7/1985 | Nelson | 285/18 |
| 4,593,937 | 6/1986 | Schawann et al. | 285/18 |
| 4,630,680 | 12/1986 | Elkins | 166/34.2 |
| 4,632,432 | 12/1986 | Reneau | 285/24 |
| 4,671,539 | 6/1987 | Reneau | 285/18 |
| 4,708,376 | 11/1987 | Jennings et al. | 285/18 X |
| 4,741,402 | 5/1988 | Smith | 166/368 X |
| 4,856,594 | 8/1989 | Jennings | 166/338 |
| 4,902,044 | 2/1990 | Williams et al. | 285/18 |
| 5,255,743 | 10/1993 | Adam et al. | 166/368 X |
| 5,299,642 | 4/1994 | Nelson et al. | 166/368 X |

*Primary Examiner*—Michael Powell Buiz
*Attorney, Agent, or Firm*—Pravel, Hewitt, Kimball & Krieger

[57] ABSTRACT

A hydraulic connector having a first assembly releasably connected to a second assembly. The first assembly comprises a substantially cylindrical body having a longitudinal bore therethrough and a receptacle portion surrounding the longitudinal bore. The first assembly has an internal circumferential chamber therein. The chamber has an upper portion and a lower portion. The second assembly comprises a substantially cylindrical body having a longitudinal bore therethrough and a protruding portion having an external circumferential groove. A movable locking ring is housed in the lower portion of the chamber. The locking ring has a first surface to matingly engage the circumferential groove. A piston is slidably received in the chamber. The piston is permitted to move axially relative to the first assembly. The piston has an upper head and a lower head connected by a sleeve segment. The piston and the chamber form individual chambers for locking and unlocking. The locking chamber can be pressurized to force the piston to a locked position in which the locking ring matingly engages the circumferential groove. The unlocking chamber can be pressurized to force the piston to an unlocked position in which the locking ring is not matingly engaged with the circumferential groove.

27 Claims, 3 Drawing Sheets

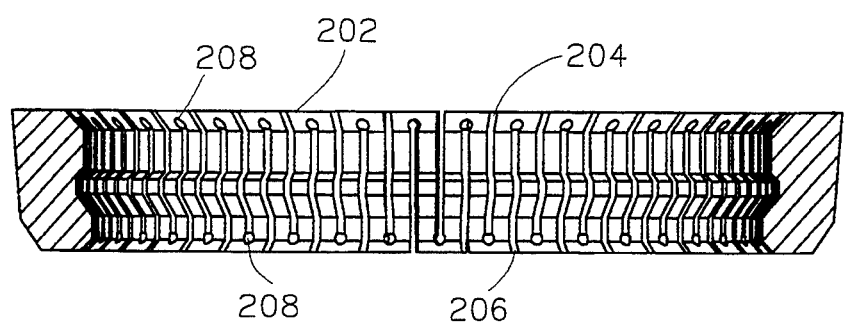
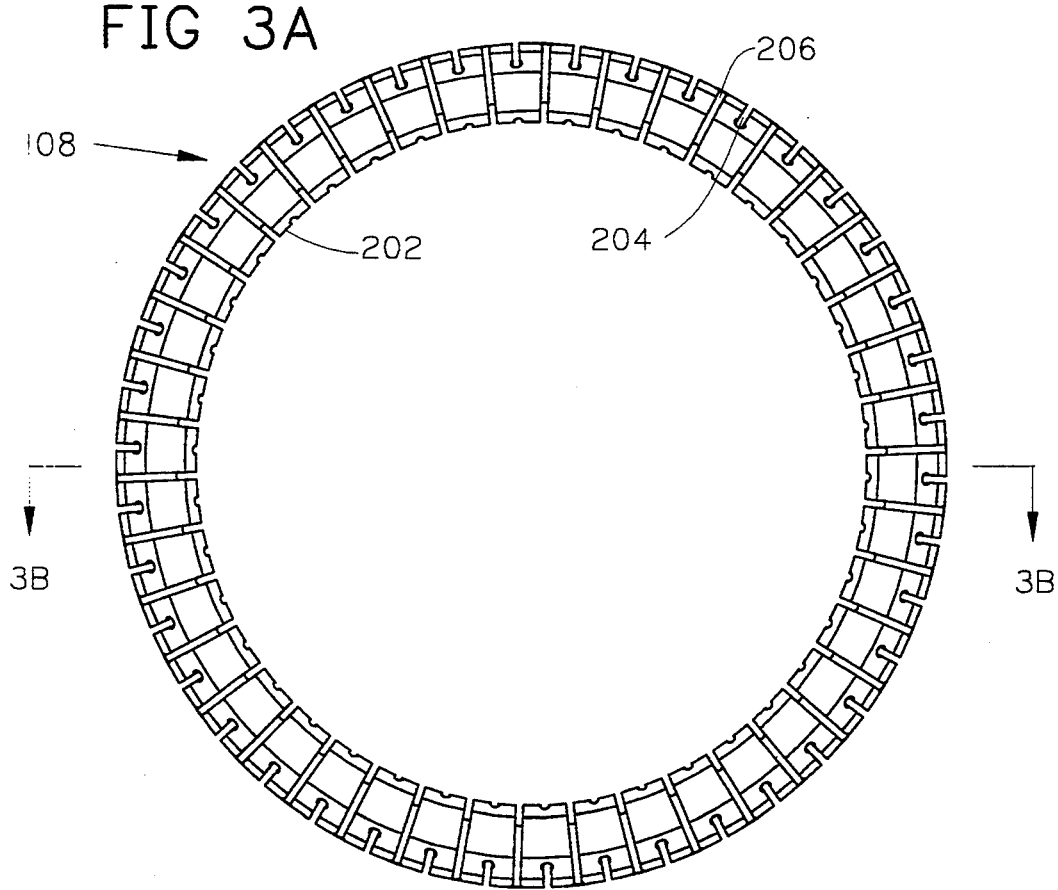

HYDRAULIC CONNECTOR

BACKGROUND OF THE INVENTION

1. Field of the Invention

The present invention relates to hydraulic connectors, and more particularly to a hydraulic connector for subsea use as a wellhead, riser or flowline connector.

2. Description of the Prior Art

Oftentimes, it is necessary to coaxially connect and disconnect two tubular bodies a substantial distance beneath the water surface. This is particularly true in the drilling and/or producing of an offshore well. A wellhead connector is connected to a subsea wellhead to provide a means for mounting blowout preventer stacks or other devices on the wellhead.

Numerous types of wellhead connectors exist in which latches, collet fingers, dogs or locking rings are used to connect and disconnect various tubular members a substantial distance beneath the water surface.

It is desirable to have a simple yet extremely dependable fluid-actuated connector which can be remotely operated between alternate positions, such as locked and unlocked positions. It is further desirable to minimize the number of components in the connector.

SUMMARY OF THE PRESENT INVENTION

The present invention is a hydraulic connector of simple construction and minimal components while being extremely dependable and remotely operable.

The hydraulic connector has a first assembly releasably connected to a second assembly. The first assembly comprises a substantially cylindrical body having a longitudinal bore therethrough and a receptacle portion surrounding the longitudinal bore. An internal circumferential chamber having a first portion and second portion is formed in the first assembly.

The second assembly comprises a substantially cylindrical body having a longitudinal bore therethrough and a protruding portion having an external circumferential groove.

A movable locking ring is housed in the lower portion of the chamber. The locking ring has a first surface to matingly engage the circumferential groove.

A piston is slidably received in the chamber. The piston is permitted to move axially relative to the first assembly. The piston has an upper head and a lower head connected by sleeve segment. The piston and the chamber form individual chambers for locking and unlocking. The locking chamber can be pressurized to force the piston to a locked position in which the locking ring matingly engages the circumferential groove. The unlocking chamber can be pressurized to force the piston to an unlocked position in which the locking ring is not matingly engaged with the circumferential groove.

BRIEF DESCRIPTION OF THE DRAWINGS

In order to more fully understand the drawings referred to in the detailed description of the present invention, a brief description of each drawing is presented, in which:

FIGS. 3A and 3B are top and cross-sectional side views, respectively, of a second embodiment of the locking ring.

DETAILED DESCRIPTION OF THE INVENTION

Figure 1:
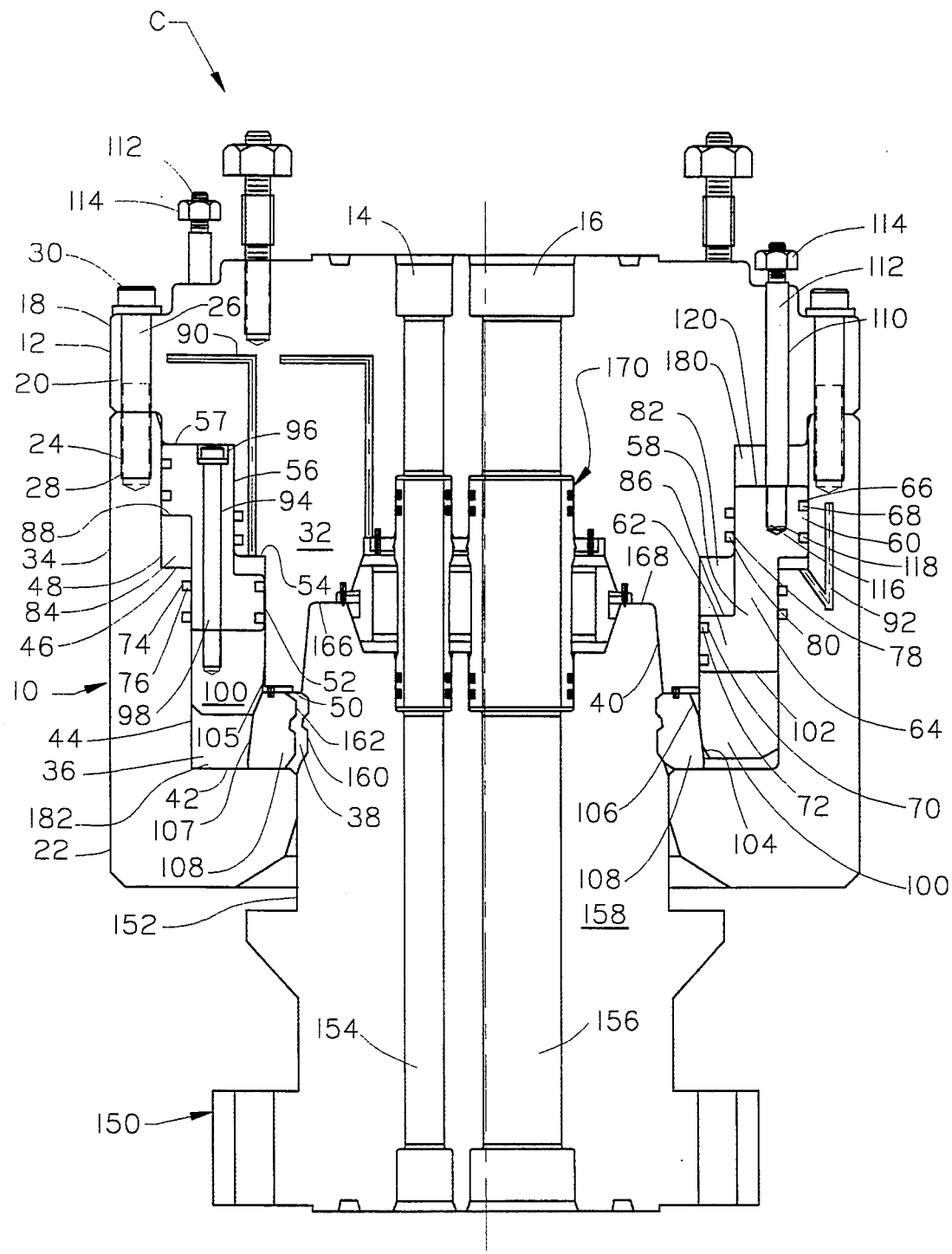
FIG. 1 is an elevational sectional view of the hydraulic connector of the present invention, the right hand side of the figure showing the hydraulic connector in a locked position and the left hand side of the figure showing the hydraulic connector in an unlocked position.

Referring now to the drawings in greater detail, the hydraulic connector, generally designated by the letter C, comprises a first assembly 10 adapted to be releasably connected to a second assembly 150.

The first assembly 10 comprises a substantially inner cylindrical body 12 having one or more longitudinal bores 14 and 16 therethrough. The inner cylindrical body 12 has an upper flange 18 having a plurality of circumferentially spaced holes 20 therethrough. The first assembly 10 further includes a substantially outer cylindrical body 22 having a plurality of circumferentially spaced threaded blind holes 24 therein. The plurality of circumferentially spaced holes 20 and the plurality of circumferentially spaced threaded blind holes 24 axially align with one another to receive an assembly bolt 26 therein. The assembly bolts 26 have a threaded portion 28 and a head 30. The assembly bolts 26 are inserted through the holes 20 and threadably engaged with the threaded blind holes 24 until the heads 30 are tightly drawn against the upper flange 18 of the inner cylindrical body 12.

As shown in FIG. 1, the inner cylindrical body 12 has a lower portion 32 which is received within an upper portion 34 of the outer cylindrical body 22 to form the first assembly 10. An internal circumferential chamber 36 is formed between the joined inner and outer cylindrical bodies 12 and 22, respectively. The circumferential chamber 36 has an opening 38 in a receptacle portion 40 of the first assembly 10. The circumferential chamber 36 is defined by a bottom face 42 which intersects with a first outer radial wall 44 of the outer cylindrical body 22. An upwardly-facing intermediate surface 46 connects the first outer radial wall 44 to a second outer radial wall 48. In the preferred embodiment of the present invention, the second outer radial wall 48 has a larger diameter than the first outer radial wall 44. The second outer radial wall 48 extends generally to the upper end of the outer cylindrical body 22.

The inner cylindrical body 12 has a lower face 50 which intersects with a first inner radial wall 52. A downwardly-facing intermediate surface 54 connects the first inner radial wall 52 to a second inner radial wall 56. The circumferential chamber 36 has a top face 57 which intersects with the second inner radial wall 56. In the preferred embodiment of the present invention, the second inner radial wall 56 has a larger diameter than the first inner radial wall 52.

It is to be understood that the inner radial walls 52 and 56 and the outer radial walls 44 and 48 are all concentric with one another. In the preferred embodiment, the distance between the pair of first radial walls 44 and 52 is the same as the distance between the pair of second radial walls 48 and 56.

Referring to FIG. 1, a sleeve-type piston 58 is slidably received in the internal circumferential chamber 36. As indicated above, the right hand side of FIG. 1 shows the sleeve-type piston 58 in a locked position and the left hand side of FIG. 1 shows the piston 58 in an unlocked position. The piston 58 is permitted to move axially relative to the first assembly 10. The piston 58 has an upper head 60 and a lower head 62 connected by a sleeve segment 64. The upper head 60 of the piston 58 faces outwardly and the lower head 62 faces inwardly relative to the sleeve segment 64.

The piston 58 is sized such that the upper head 60 is slidably received between the pair of second radial walls 48 and 56 and the lower head 62 is slidably received between the pair of first radial walls 44 and 52.

The outwardly facing upper head 60 of the piston 58 includes a pair of circumferential grooves 66 for receiving a pair of sealing means 68 to provide a slidable fluid-tight seal between the upper head 60 and the second outer radial wall 48. Similarly, the inwardly-facing lower head 62 includes a pair of circumferential grooves 70 for receiving a pair of sealing means 72 to provide a slidable fluid-tight seal between the lower head 62 and the first inner radial wall 52.

A pair of circumferential grooves 74 for receiving a pair of sealing means 76 are formed in the upper portion of the first outer radial wall 44 to provide a slidable fluid-tight seal between the outwardly-facing side of the sleeve segment 64 and the first outer radial wall 44. Similarly, a pair of circumferential grooves 78 for receiving a pair of sealing means 80 are formed in the lower portion of the second inner radial wall 56 to provide a slidable fluid-tight seal between the inwardly-facing side of the sleeve segment 64 and the second inner radial wall 44.

The piston 58 in the circumferential chamber 36 forms an individual locking chamber 82 and an individual unlocking chamber 84. The locking chamber 82 is formed between an upper surface 86 of the lower head 62, the downwardly-facing intermediate surface 54, the first inner radial wall 52 and the inwardly-facing side of the sleeve segment 64. The unlocking chamber 84 is formed between a lower surface 88 of the upper head 60, the upwardly-facing intermediate surface 46, the second outer radial wall 48 and the outwardly-facing side of the sleeve segment 64.

A lock port 90 is routed from the exterior of the inner cylindrical body 12 to the downwardly-facing intermediate surface 54 of the locking chamber 82. An unlock port 92 is routed from the exterior of the outer cylindrical body 22 to the upwardly-facing intermediate surface 46 of the unlocking chamber 84.

Although not shown, it is to be understood that the lock and unlock ports 90 and 92, respectively, are connected to remote pressurized fluid sources which are controlled to selectively position the piston 58 in the locked position, as shown in the right hand side of FIG. 1, by pressurizing the locking chamber 82 via the lock port 90 or in the unlocked position, as shown in the left hand side of FIG. 1, by pressurizing the unlocking chamber 84 via the unlock port 92. Fluid pressure is allowed to escape from the unlocking chamber during the pressurizing of the locking chamber and vice versa. Preferably the external connections for the ports 90 and 92 project normal to the upper surface of the inner cylindrical body 12 and are spaced circumferentially between the assembly bolts 26.

A manual override system is provided in order to be able to unlock the connector C if there is a loss of pressurized fluid. As shown in the right hand side of FIG. 1, a plurality of rod bores 110 extend from the upper surface of the inner cylindrical body 12 to the top face 57 of the circumferential chamber 36. A manual override rod 112 is inserted through the rod bore 110 and extends above the upper surface of the inner cylindrical body 12. A lifting nut or head 114 is attached to the override rod 112. The lower end 116 of the override rod 112 is threadably engaged with a threaded blind bore 118 in a top face 120 of the piston 58. The override rods 112 move up and down with the piston 58. In the case of pressurized fluid failure, the piston 58 can be manually raised by lifting or pulling on the rod nuts 114 which releases the locking ring 108.

The piston 58 includes a plurality of circumferentially spaced longitudinal bores 94 extending through the sleeve segment 64. The longitudinal bores 94 includes a counterbore 96 at the upper end of the sleeve segment 64. A cam bolt 98 extends through the longitudinal bore 94 with the bolt head being received in the counterbore 96. The lower end of the cam bolt 98 threadably engages a cam ring 100 at a lower surface 102 of the piston 58. The cam ring 100 has a first tapered cam face 104 which is in generally opposing relationship with a corresponding first tapered face 106 of a lock ring 108 when in the unlocked position as shown on the left hand side of FIG. 1. Preferably, the cam ring 100 has a second slightly tapered cam face 105 which is in generally opposing relationship with a corresponding second slightly tapered face 107 of the lock ring 108 when in the locked position as shown on the right hand side of FIG. 1.

The lock ring 108 is housed in the opening 78 of the circumferential chamber 36 between the lower face 50 of the inner cylindrical body 12 and the bottom face 42. The lock ring 108 is free to be moved inwardly toward the receptacle portion 40 of the first assembly 10.

The second assembly 150 comprises a substantially cylindrical body 152 having one or more longitudinal bores 154 and 156 therethrough corresponding to the longitudinal bores 14 and 16, respectively, in the first assembly 10. As shown in FIG. 1, the inner cylindrical body 12 of the first assembly 10 includes a seal assembly 170 which forms a fluid-tight seal between each of the corresponding longitudinal bores 14, 154, and 16, 156 when the connector C is joined together.

The second assembly 150 has a protruding portion 158 having an external circumferential groove section 160. The movable lock ring 108 has a complementary groove section 162 to matingly engage the circumferential groove section 160 of the protruding portion 158 of the second assembly 150. The protruding portion 158 has an end face 166 which limits the downward engagement of the first assembly 10 by abutting a shoulder 168 in the first assembly 10. The groove sections 160 and 162 are aligned when the end face 166 abuts the shoulder 168.

Referring to the right hand side of FIG. 1, the lock ring 108 is movable inwardly to project into the groove section 160 of the second assembly 150 by downward travel of the piston 58 and cam ring 100. The first tapered cam face 104 slides downwardly along the first tapered face 106 of the lock ring 108 to displace the lock ring 108 inwardly toward the groove section 160 of the second assembly 150. As the piston 58 and cam ring 100 continue their downward travel the second slightly tapered faces 105 and 107 slidably contact and fully engage the complementary groove sections 162 and 160.

The downward travel of the piston 58 and cam ring 100 occurs when suitable fluid pressure is supplied from the lock port 90 to pressurize the locking chamber 82. The fluid pressure acts downwardly on the upper surface 86 of the lower head 62 of the piston 58. The pairs of sealing means 72 and 80 carried by the lower head 62 of the piston 58 and the second inner radial wall 56, respectively, seal off the locking chamber 82.

When it is desired to release and unlock the connector C from the locked position, suitable fluid pressure is supplied from the unlock port 92 to pressurize the unlocking chamber 84. The fluid pressure acts upwardly on the lower surface 88 of the upper head 60 of the piston 58 which causes the upward travel of the piston 58 and cam ring 100. The pairs of sealing means 68 and 76 carried by the upper head 60 of the piston 58 and the first outer radial wall 44, respectively, seal off the unlocking chamber 84. Once the locking ring 108 is released by the cam ring 100, the locking ring 108 is free to cam outwardly. The outward camming action may be caused by various means, as for example, by the resilience of the locking ring 108, by outwardly-forcing spring means, or by the outward force of the groove section 160 as the first assembly 10 is lifted upwardly relative to the second assembly 150.

A chamber 180 is formed above the piston 58 after assembly. Similarly, a chamber 182 is formed below the piston 58 and cam ring 100 and outside of the locking ring 108. The chambers 180 and 182 are not sealed and are allowed to free flood with water as the piston 58 travels to enlarge a chamber and are evacuated as the piston 58 travels to reduce the volume of a chamber. Preferably the chamber 180 has a larger maximum volume then the chamber 182, resulting in a positive bias in the locked position.

The location of the chambers 82 and 84 relative to the piston 58 allows the upper and lower faces of the piston 58 to be available for receiving various components and allows axial boring of the sleeve segment 64 without requiring complicated sealing arrangements. This simplifies overall design of the first assembly 10 and allows greater flexibility in selection and attachment of various components which must be connected to the piston 58.

Figure 2A:
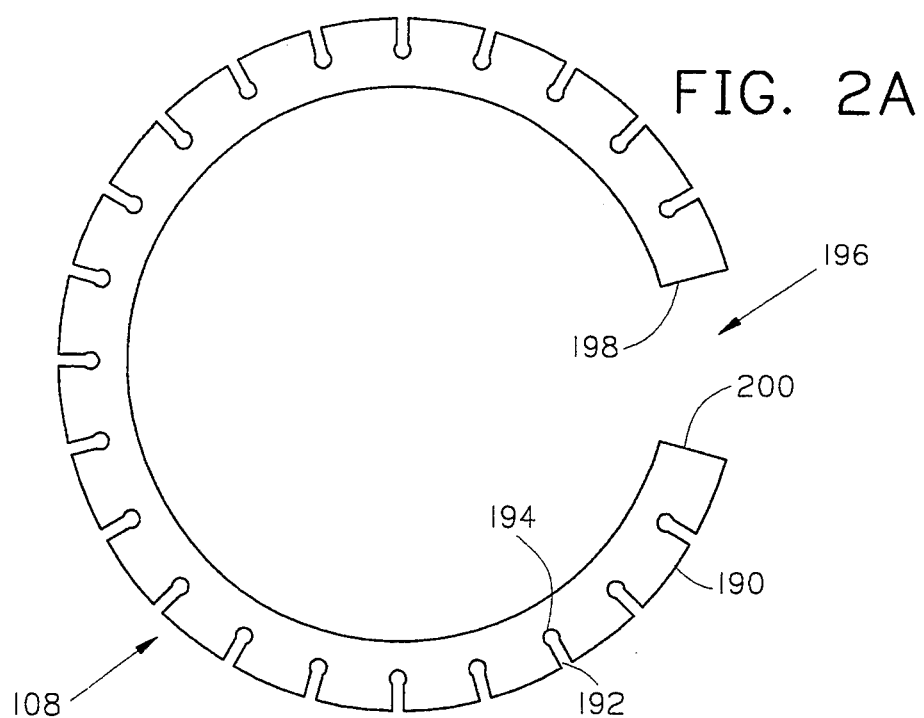
FIGS. 2A and 2B are top views of a first embodiment of the locking ring in open and closed positions, respectively.
Figure 2B:
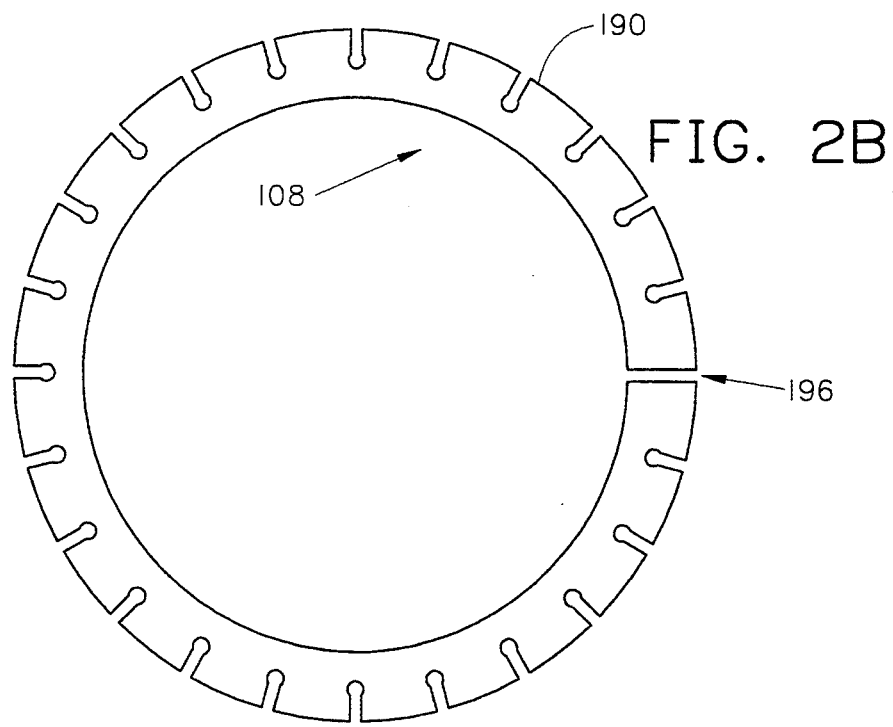

The preferred alternate embodiments of the locking ring 108 are shown in FIGS. 2A, 2B, 3A and 3B. A split ring 190 is shown in FIGS. 2A and 2B. The split ring 190 contains a plurality of radial slots 192 on the outer circumferential surface. The bottom 194 of each slot 192 is preferably slightly enlarged and radiused to relieve stress. The inner circumferential surface of the split ring 190 is formed to mate with the groove section 160 of the second assembly 150. The split ring 190 is formed to have a neutral shape having a gap 196 between the two ends 198 and 200 of the split ring 190. With this neutral shape, when the piston 58 is moved to the unlocked position, the split ring 190 automatically releases. When the cam ring 100 is moved downwardly to the locked position, the cam ring 100 interacts with the split ring 190 and causes the gap 196 to be greatly reduced in size, as shown in FIG. 2B, with the split ring 190 matingly engaging the second assembly 150. The split ring 190 is preferably formed of 4340 alloy steel. On a nominal 20" split ring 190, there are preferably 24 slots 192, with the slots being approximately 1/16 inches wide and 1⅛ inches deep in the open or neutral position. The bottom 194 preferably has a radius of 3/32".

A second embodiment of the locking ring 108 is the full ring 202 shown in FIGS. 3A and 3B. The full ring 202 contains a plurality of slots 204 and 206 transverse to the full ring 202 and located radially on the full ring 202. The slots 204 are provided in the top face of the full ring 202, while the slots 206 are provided in an interleaved relationship in the bottom face of the full ring 202. Preferably there are 42 individual slots 204 and 206. The bottom 208 of each slot 204 and 206 is preferably slightly enlarged and radiused to relieve stress. The full ring 202 is formed to have a neutral shape corresponding to the unlocked size to provide for an automatic release, as with the split ring 190. When the cam ring 100 is driven into the full ring 202 by the downward travel of the piston 58, the inward portions of the slots 204 and 206 are compressed and the outwardly facing portions are slightly compressed, resulting in the full ring 202 having a reduced overall diameter so that the full ring 202 matingly engages the groove section 162 of the second assembly 150. As the cam ring 100 is moved upwardly, the full ring 202 returns to its neutral diameter and the second assembly 150 is disengaged. Preferably for a nominal 20" full ring 202, the slots 204 and 206 are preferably ⅛ inch wide and reach to within 0.188 inches of the opposing face of the full ring 202. The bottom 208 preferably has a diameter of 0.188 inches. Preferably the full ring 202 is formed of 4340 alloy steel.

It is to be understood that the locking ring 108 could also be a snap ring or could also comprise a plurality of locking dogs circumferentially spaced in the circumferential chamber 36.

The foregoing disclosure and description of the invention is illustrative and explanatory thereof, and various changes in the size, shape, and materials, as well as in the details of illustrative construction and assembly, may be made without departing from the spirit of the invention.

We claim:

1. A hydraulic connector comprising:
   a first assembly comprising a substantially cylindrical body having a longitudinal bore therethrough and a receptacle portion, said first assembly having an internal circumferential chamber therein, said chamber having a lower portion in communication with said receptacle portion and an upper portion;
   a second assembly comprising a substantially cylindrical body having a longitudinal bore therethrough and a protruding portion;
   means for engaging said protruding portion of said second assembly within said receptacle portion of said first assembly;
   a sleeve-type piston slidably received in said chamber, said sleeve-type piston permitted to move axially relative to said first assembly, said sleeve-type piston having an upper head and a lower head connected by a sleeve segment with one of said heads facing outwardly and the other of said heads facing inwardly relative to said sleeve segment;
   wherein said sleeve-type piston and said chamber form an individual locking chamber and an individual unlocking chamber;
   first means for pressurizing said locking chamber; and
   second means for pressurizing said unlocking chamber.

2. The hydraulic connector according to claim 1, further comprising:
   first means for sealing said locking chamber; and
   second means for sealing said unlocking chamber.

3. The hydraulic connector according to claim 2, wherein said first means for sealing comprises an upper seal and a lower seal between said first assembly and said sleeve-type piston and said second means for sealing comprises an upper seal and a lower seal between said first assembly and said sleeve-type piston.

4. The hydraulic connector according to claim 1, wherein said means for engaging comprises:
   a circumferential groove in said protruding portion of said second assembly; and
   a movable locking ring in said chamber, said movable locking ring having a first surface to matingly engage said circumferential groove and a second surface upon which to force said movable locking ring into mating engagement with said circumferential groove.

5. The hydraulic connector according to claim 4, further comprising a cam ring connected to said sleeve-type piston, said cam ring having a cam surface to contact said second surface of said movable locking ring,
   wherein said sleeve-type piston moves between an unlocked position wherein said movable locking ring is not forced into mating engagement with said circumferential groove and a locked position wherein said cam ring forces said movable locking ring into mating engagement with said circumferential groove.

6. The hydraulic connector according to claim 5, wherein said lower head has a lower surface and said cam ring is connected to said lower surface.

7. The hydraulic connector according to claim 4, wherein said movable locking ring is a split ring having a plurality of radial slots in the outer circumferential face.

8. The hydraulic connector according to claim 4, wherein said movable locking ring is a full ring having upper and lower faces normal to the plane of said full ring and having a plurality of slots normal to said upper and lower faces, said slots being arranged radially and interleaved.

9. The hydraulic connector according to claim 1, wherein said upper head faces outwardly and said lower head faces inwardly relative to said sleeve segment.

10. The hydraulic connector according to claim 1, wherein said locking and unlocking chambers are formed in said circumferential chamber beneath said upper head and above said lower head.

11. The hydraulic connector according to claim 1, wherein said circumferential chamber has an upwardly-facing intermediate surface and a downwardly-facing intermediate surface and said upper head has a lower surface and said lower head has an upper surface,
   wherein said locking chamber is formed between said downwardly-facing intermediate surface of said circumferential chamber and said upper surface of said lower head and said unlocking chamber is formed between said upwardly-facing intermediate surface of said circumferential chamber and said lower surface of said upper head.

12. A hydraulic connector comprising:
   a first assembly comprising a substantially cylindrical body having a longitudinal bore therethrough and a receptacle portion, said first assembly having an internal circumferential chamber therein, said chamber having a lower portion in communication with said receptacle portion and an upper portion;
   a second assembly comprising a substantially cylindrical body having a longitudinal bore therethrough and a protruding portion;
   means for engaging said protruding portion of said second assembly within said receptacle portion of said first assembly;
   a sleeve-type piston slidably received in said chamber, said sleeve-type piston permitted to move axially relative to said first assembly, said sleeve-type piston having an upper head and a lower head connected by a sleeve segment with one of said heads facing outwardly and the other of said heads facing inwardly relative to said sleeve segment;
   wherein said sleeve-type piston and said chamber form an individual locking chamber and an individual unlocking chamber, said locking and unlocking chambers are formed in said circumferential chamber beneath said upper head and above said lower head;
   first means for pressurizing said locking chamber; and
   second means for pressurizing said unlocking chamber.

13. The hydraulic connector according to claim 12, wherein said upper head faces outwardly and said lower head faces inwardly relative to said sleeve segment.

14. The hydraulic connector according to claim 13, wherein said means for engaging comprises:
   a circumferential groove in said protruding portion of said second assembly; and
   a movable locking ring in said chamber, said movable locking ring having a first surface to matingly engage said circumferential groove and a second surface upon which to force said movable locking ring into mating engagement with said circumferential groove.

15. The hydraulic connector according to claim 14, further comprising a cam ring connected to said sleeve-type piston, said cam ring having a cam surface to contact said second surface of said movable locking ring,
   wherein said sleeve-type piston moves between an unlocked position wherein said movable locking ring is not forced into mating engagement with said circumferential groove and a locked position wherein said cam ring forces said movable locking ring into mating engagement with said circumferential groove.

16. The hydraulic connector according to claim 15, wherein said lower head has a lower surface and said cam ring is connected to said lower surface.

17. The hydraulic connector according to claim 14, wherein said movable locking ring is a split ring having a plurality of radial slots in the outer circumferential face.

18. The hydraulic connector according to claim 12, wherein said movable locking ring is a full ring having upper and lower faces normal to the plane of said full ring and having a plurality of slots normal to said upper and lower faces, said slots being arranged radially and interleaved.

19. The hydraulic connector according to claim 12, wherein said circumferential chamber has an upwardly-facing intermediate surface and a downwardly-facing intermediate surface and said upper head has a lower surface and said lower head has an upper surface,
   wherein said locking chamber is formed between said downwardly-facing intermediate surface of said circumferential chamber and said upper surface of said lower head and said unlocking chamber is formed between said upwardly-facing intermediate surface of said circumferential chamber and said lower surface of said upper head.

20. A hydraulic connector comprising:

a first assembly comprising a substantially cylindrical body having a longitudinal bore therethrough and a receptacle portion, said first assembly having an internal circumferential chamber therein comprising a lower portion in communication with said receptacle portion and an upper portion, said chamber having an upwardly-facing intermediate surface and a downwardly-facing intermediate surface;

a second assembly comprising a substantially cylindrical body having a longitudinal bore therethrough and a protruding portion;

means for engaging said protruding portion of said second assembly within said receptacle portion of said first assembly;

a sleeve-type piston slidably received in said chamber, said sleeve-type piston permitted to move axially relative to said first assembly, said sleeve-type piston having an upper head and a lower head connected by a sleeve segment with one of said heads facing outwardly and the other of said heads facing inwardly relative to said sleeve segment, said upper head having a lower surface and said lower head having an upper surface;

wherein said sleeve-type piston and said chamber form an individual locking chamber and an individual unlocking chamber, said locking chamber is formed between said downwardly-facing intermediate surface of said circumferential chamber and said upper surface of said lower head and said unlocking chamber is formed between said upwardly-facing intermediate surface of said circumferential chamber and said lower surface of said upper head;

first means for pressurizing said locking chamber; and second means for pressurizing said unlocking chamber.

21. The hydraulic connector according to claim 20, wherein said upper head faces outwardly and said lower head faces inwardly relative to said sleeve segment.

22. The hydraulic connector according to claim 21, wherein said locking and unlocking chambers are formed in said circumferential chamber beneath said upper head and above said lower head.

23. The hydraulic connector according to claim 20, wherein said means for engaging comprises:

a circumferential groove in said protruding portion of said second assembly; and a movable locking ring in said chamber, said movable locking ring having a first surface to matingly engage said circumferential groove and a second surface upon which to force said movable locking ring into mating engagement with said circumferential groove.

24. The hydraulic connector according to claim 23, further comprising a cam ring connected to said sleeve-type piston, said cam ring having a cam surface to contact said second surface of said movable locking ring, wherein said sleeve-type piston moves between an unlocked position wherein said movable locking ring is not forced into mating engagement with said circumferential groove and a locked position wherein said cam ring forces said movable locking ring into mating engagement with said circumferential groove.

25. The hydraulic connector according to claim 24, wherein said lower head has a lower surface and said cam ring is connected to said lower surface.

26. The hydraulic connector according to claim 23, wherein said movable locking ring is a split ring having a plurality of radial slots in the outer circumferential face.

27. The hydraulic connector according to claim 23, wherein said movable locking ring is a full ring having upper and lower faces normal to the plane of said full ring and having a plurality of slots normal to said upper and lower faces, said slots being arranged radially and interleaved.

* * * * *

UNITED STATES PATENT AND TRADEMARK OFFICE
CERTIFICATE OF CORRECTION

PATENT NO.    : 5,433,274

DATED         : JULY 18, 1995

INVENTOR(S)   : JERRY C. GRAFF
                WILLIAM C. PARKS

It is certified that error appears in the above-identified patent and that said Letters Patent is hereby corrected as shown below:

Column 2, line 6, please delete "top" and insert --bottom--.

Signed and Sealed this

Nineteenth Day of September, 1995

Attest:

BRUCE LEHMAN

Attesting Officer

Commissioner of Patents and Trademarks